(12) United States Patent
Notari et al.

(10) Patent No.: US 12,218,797 B1
(45) Date of Patent: Feb. 4, 2025

(54) METHODS FOR NETWORK CHANGE TRACKING AND ROLLBACK OF CHANGES BASED ON CHANGE TICKETS

(71) Applicant: Cisco Technology, Inc., San Jose, CA (US)

(72) Inventors: Jason David Notari, Pleasanton, CA (US); Debashis Patnala Rao, Cupertino, CA (US); Viral Rajeshbhai Barot, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/382,911

(22) Filed: Oct. 23, 2023

Related U.S. Application Data (60) Provisional application No. 63/527,905, filed on Jul. 20, 2023.

(51) Int. Cl.
*H04L 41/0859* (2022.01)
*H04L 41/08* (2022.01)
*H04L 41/0813* (2022.01)

(52) U.S. Cl.
CPC ...... *H04L 41/0863* (2013.01); *H04L 41/0813* (2013.01); *H04L 41/0879* (2013.01)

(58) Field of Classification Search
CPC ............. H04L 41/0863; H04L 41/0813; H04L 41/0879

See application file for complete search history.

(56) References Cited

U.S. PATENT DOCUMENTS

| | | | | |
|---|---|---|---|---|
| 6,938,081 B1* | 8/2005 | Mir | ...................... | H04L 41/0879 717/171 |
| 8,880,690 B1* | 11/2014 | Kennedy | ............. | H04L 41/0823 709/224 |
| 10,003,496 B1* | 6/2018 | Kennedy | ............. | H04L 41/0866 |
| 10,135,685 B2* | 11/2018 | Hasan | ................ | H04L 41/0863 |
| 10,476,742 B1* | 11/2019 | Szarvas | ............... | H04L 41/5054 |
| 11,075,803 B1* | 7/2021 | Kapadia | ................ | H04L 41/082 |
| 2003/0105761 A1* | 6/2003 | Lagerman | ........... | H04L 41/0859 |

(Continued)

FOREIGN PATENT DOCUMENTS

| | | | | |
|---|---|---|---|---|
| CN | 106063313 B | * 10/2019 | ......... | H04L 41/0863 |
| WO | WO2016180164 | 11/2019 | | |
| WO | WO-2023172263 A1 | * 9/2023 | ......... | G06Q 10/0631 |

*Primary Examiner* — Oanh Duong
(74) *Attorney, Agent, or Firm* — Lee & Hayes, P.C.

(57) ABSTRACT

Techniques and architecture are described for initializing, reviewing/approving, and deploying changes within a network. Each change is associated with a particular change ticket. When a change needs to be rolled back, the original change ticket may be analyzed to determine what actions need to be performed to roll back the change. A plan of the needed actions may then be presented to a reviewer in a rollback ticket. The original change ticket may be cancelled and a new ticket, e.g., the rollback ticket, may be prepared that includes the plan for the rollback, e.g., the one or more actions needed to roll back the initial change. In configurations, a change ticket may include multiple changes and thus, for rollback, either all the changes associated with the change ticket may be rolled back or only the last change or action that was initially made may be rolled back.

20 Claims, 5 Drawing Sheets

(56) References Cited

U.S. PATENT DOCUMENTS

| | | | |
|---|---|---|---|
| 2013/0305030 A1* | 11/2013 | Chen | G06F 11/261 |
| | | | 713/100 |
| 2015/0106339 A1* | 4/2015 | Hasan | H04L 41/0863 |
| | | | 707/684 |
| 2017/0180201 A1* | 6/2017 | Guven | G06N 5/01 |
| 2018/0349179 A1 | 12/2018 | Worboys et al. | |
| 2020/0162462 A1* | 5/2020 | Zayats | H04L 41/082 |
| 2022/0222052 A1* | 7/2022 | Watt | G06F 8/71 |
| 2022/0237197 A1 | 7/2022 | Devta et al. | |
| 2023/0205516 A1* | 6/2023 | Franzen | H04L 67/51 |
| | | | 717/120 |
| 2023/0206144 A1* | 6/2023 | Romagnoli | G06Q 10/06311 |
| | | | 705/7.13 |
| 2024/0089174 A1* | 3/2024 | Woodworth | H04L 41/0836 |

* cited by examiner

METHODS FOR NETWORK CHANGE TRACKING AND ROLLBACK OF CHANGES BASED ON CHANGE TICKETS

CROSS-REFERENCE TO RELATED APPLICATION

This patent application is a nonprovisional of and claims priority to U.S. Provisional Patent Application No. 63/527,905, filed Jul. 20, 2023, which is fully incorporated herein by reference.

TECHNICAL FIELD

The present disclosure relates generally to methods for network change tracking and rollback of changes based on change tickets, and more particularly, to a framework for associating each network change with a change ticket and rolling back changes based on changes tickets associated with the changes.

BACKGROUND

Users want the ability to track changes throughout their network infrastructure, e.g., the ability to track changes at network objects throughout their network infrastructure. Users also want the ability to apply limits as to who can make various changes as well as have accountability and approval gates prior to deploying changes within the network infrastructure. Users also want the ability to have accountability and approval gates for change rollback for both partial unrealized changes as well as for fully realized changes deployed within the network infrastructure.

It is difficult for change tracking within complex systems such as those that use network controllers or network management systems to associate "the reason" changes are made across a variety of interdependent devices as well as interdependent configuration objects. Recovery from incorrect changes without collateral damage is manual and error prone. Currently, in order to rollback changes within networks, the rollbacks are time based. For example, snapshots of a current state of a network object may be taken prior to when a change occurs. In order to roll back, e.g., undo, a change, the network object is simply "rolled back" to the previous state, e.g., to the state when the snapshot was taken. However, any other changes made to the network object after the initial change was made are also lost when rolling back the initial change to the previous state.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

The present disclosure provides techniques and architecture for initializing, reviewing/approving, and deploying changes within a network. Each change is associated with a particular change ticket. When a change needs to be rolled back, e.g., the change needs to be undone, the original change ticket may be analyzed to determine what actions need to be performed to roll back the change. A plan of the needed actions may then be presented to a reviewer in a rollback ticket. The original change ticket may be cancelled and a new ticket, e.g., the rollback ticket, may be prepared that includes the plan for the rollback, e.g., the one or more actions needed to roll back the initial change. In configurations, a change ticket may include multiple changes and thus, for rollback, either all the changes associated with the change ticket may be rolled back or only the last change or action that was initially made may be rolled back.

As an example, a method may include creating, by a first user, a change ticket for making one or more changes at a network object of a network. The method may also include making, by the first user, the one or more changes within a network controller of the network. The method may further include submitting, by the first user to a second user, the change ticket for approval. The method may additionally include based at least in part on approval of the change ticket, deploying, by a third user, the one or more changes at the network object. The method may also include determining that at least one change of the one or more changes needs to be undone. The method may further include based at least in part on the change ticket, determining, by the first user, a plan to undo the at least one change of the one or more changes associated with the change ticket, wherein the plan includes one or more actions to undo only the at least one change of the one or more changes at the network object. The method may additionally include creating, by the first user, a rollback ticket to implement the plan to undo the at least one change of the one or more changes at the network object. The method may also include based at least on the plan, implementing, by the first user, the one or more actions to undo only the at least one change of the one or more changes at the network object within the network controller of the network. The method may further include submitting, by the first user to the second user, the rollback ticket for approval. The method may additionally include based at least in part on approval of the rollback ticket, deploying, by the third user, the one or more actions to undo only the at least one change of the one or more changes at the network object.

EXAMPLE EMBODIMENTS

In accordance with configurations described herein, as previously noted, techniques and architecture are provided for initializing, reviewing/approving, and deploying changes within a network. Each change is associated with a particular change ticket. When a change needs to be rolled back, e.g., the change needs to be undone, the original change ticket may be analyzed to determine what actions need to be performed to roll back the change. A plan of the needed actions may then be presented to a reviewer in a rollback ticket. The original change ticket may be cancelled and a new ticket, e.g., the rollback ticket, may be prepared that includes the plan for the rollback, e.g., the one or more actions needed to roll back the initial change. In configurations, a change ticket may include multiple changes and thus, for rollback, either all the changes associated with the change ticket may be rolled back or only the last change or action that was initially made may be rolled back.

Most existing network management systems perform rollback by moving state of one or more switches to a previous checkpoint in time. In accordance with configurations, described herein, change control tracks all user actions performed on a network and allows a user to rollback specific set of changes or even undo a change action which is still in flight, essentially giving the user the ability to act like an editor.

More particularly, in configurations specific tracking may be done when a user performs a change action (create, update, delete) and the change is recorded against a ticket (change ticket). Multiple tickets may have modifications at the same time, but a network object within the network may not be modified at the same time with multiple changes. Conflict detection blocks changes to a network object if that network object has active changes involving a different ticket. Some examples of network objects are physical interfaces, links (devices connecting two or more devices) overlay network definitions, virtual routing and forwarding (VRF) attachments, and network fabric properties. Approval and deployment of tickets realizes changes on network objects.

In accordance with configurations described herein, rollback involves both restoration of a controller state and network object state as well as calculation and deployment of the removal of a configuration specific to the individual change. In accordance with configurations described herein, rollback is not a restoration of a previous configuration file as that would limit the ability to have multiple changes in parallel. When the rollback of a ticket is attempted by a user, the current state of the system is evaluated to generate a rollback plan to determine the reverse actions needed to revert (undo) the change. Checks are done at this point prior to changes looking for reverse conflicts. If allowed a new ticket (rollback ticket) tracks the rollback changes allowing tracking and approval and deployment for the rollback action.

In configurations, deployment of changes, when made, makes use of a delta computation involving a comparison of current device configuration vs. expected configuration with explicit negative configuration also calculated for specific changes involving removal of a configuration. In addition to the full change ticket rollback, in configurations there is a capability to undo the last action within a given active ticket (e.g., to revert an individual change without impact to other user changes).

Thus, the techniques and architecture described herein provide an ability to individually rollback changes across a fabric without impacting other non-conflicting changes, whereas other methods are focused on a "Time Machine" capability that removes the particular change(s) and all other changes made after the particular change(s).

More particularly, a user makes (stages) a configuration change within a network controller from a user interface (UI) or a script using the representational state transfer (REST) application programming interfaces (APIs). Change records are created and stored in a persistent store to record the change ticket used for tracking changes (actions) and the API that triggered the change. The change records also include information (e.g., reasons for the change), the user identity (ID) making the change, network object(s) to which the changes were made, and a timestamp. The user making the change has privileges for making such changes. The change ticket goes through an approval workflow in order to prepare the change for deployment at one or more network objects. A designated user has privileges to review and approve the changes. The review is specific to the changes associated with the change ticket allowing multiple, non-overlapping changes (tickets) to be in progress at the same time. Deployment is allowed by users with appropriate privileges. In configurations, users may have privileges for both making (staging) and deploying changes. In some configurations, users may have privileges for making (staging), reviewing/approving, and/or deploying changes.

In configurations, for rollback of changes, a "full ticket rollback" is a capability to undo/rollback all the changes (actions) associated with the change ticket. The changes may already have been deployed to the network objects or may still be being deployed at network objects. An action level rollback is a capability to undo the last change that has not yet been deployed. For both rollback options, a user decides which rollback (full vs action level) is desired. Changes associated with the change ticket are analyzed and a rollback plan is determined. A set of one or more changes (actions) to take the network object from its current state to its state prior to when the change was initiated is determined. The changes to the objects in the ticket are analyzed and the optimal order of changes is determined. The set of changes is also analyzed to remove duplicates and consolidate the changes to reach the original state. Conflicts are detected that would prevent a successful rollback, e.g., a resource (e.g., internet protocol (IP) address, visual networking index (VNI), virtual local area network (VLAN), etc.) used by another network object to rollback is in use currently by another network object. The rollback is aborted on a conflict. If no conflicts, execute the set of changes to complete the rollback. Rollback of a deployed change ticket will auto-create a new ticket (rollback ticket) with the associated plan (set) of changes for the rollback and some or all of the components included with the change ticket previously described. The new rollback ticket must go through the approval workflow previously described to be deployed to the network.

Accordingly, in configurations, a method includes creating, by a first user, a change ticket for making one or more changes at a network object of a network. The method also includes making, by the first user, the one or more changes within a network controller of the network. The method further includes submitting, by the first user to a second user, the change ticket for approval. The method additionally includes based at least in part on approval of the change ticket, deploying, by a third user, the one or more changes at the network object. The method also includes determining that at least one change of the one or more changes needs to be undone. The method further includes based at least in part on the change ticket, determining, by the first user, a plan to undo the at least one change of the one or more changes associated with the change ticket, wherein the plan includes one or more actions to undo only the at least one change of the one or more changes at the network object. The method additionally includes creating, by the first user, a rollback ticket to implement the plan to undo the at least one change of the one or more changes at the network object. The method also includes based at least on the plan, implementing, by the first user, the one or more actions to undo only the at least one change of the one or more changes at the network object within the network controller of the network. The method further includes submitting, by the first user to the second user, the rollback ticket for approval. The method additionally includes based at least in part on approval of the rollback ticket, deploying, by the third user, the one or more actions to undo only the at least one change of the one or more changes at the network object.

In some configurations, the method also comprises based at least in part on non-approval of the change ticket, sending, by the second user to the first user, the change ticket, editing, by the first user, the change ticket, and re-submitting, by the first user to the second user, the change ticket for approval.

In further configurations, the method further comprises based at least in part on non-approval of the change ticket, sending, by the second user to the first user, the change ticket and deleting, by the first user, the change ticket.

In additional configurations, at least the first user is also the third user.

In some configurations, the change ticket comprises multiple changes for the network object and deploying the multiple changes at the network object comprises serially deploying the multiple changes at the network object.

In further configurations, determining that at least one change of the one or more changes needs to be undone comprises determining that only a last change of the one or more changes needs to be undone.

In additional configurations, determining that at least one change of the one or more changes needs to be undone comprises determining that all of the one or more changes need to be undone.

In some configurations, the change ticket comprises multiple changes for multiple network objects and deploying the multiple changes at the multiple network objects comprises deploying the multiple changes at the multiple network objects in parallel.

Thus, the techniques and architecture provide for initializing, reviewing/approving, and deploying changes within a network. Each change is associated with a particular change ticket. When a change needs to be rolled back, e.g., the change needs to be undone, the original change ticket may be analyzed to determine what actions need to be performed to roll back the change. A plan of the needed actions may then be presented to a reviewer in a rollback ticket. The original change ticket may be cancelled and a new ticket, e.g., the rollback ticket, may be prepared that includes the plan for the rollback, e.g., the one or more actions needed to roll back the initial change. In configurations, a change ticket may include multiple changes and thus, for rollback, either all the changes associated with the change ticket may be rolled back or only the last change or action that was initially made may be rolled back. More particularly, changes made to the network object are always associated with some type of ticket, e.g., a change ticket or a rollback ticket. The rollback ticket may be used to specifically undo a particular change at the network object. Changes made subsequent to the changes associated with the original change ticket may, in most cases, be unaffected by the rollback ticket's plan of action(s) to undo the change deployed by the change ticket.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
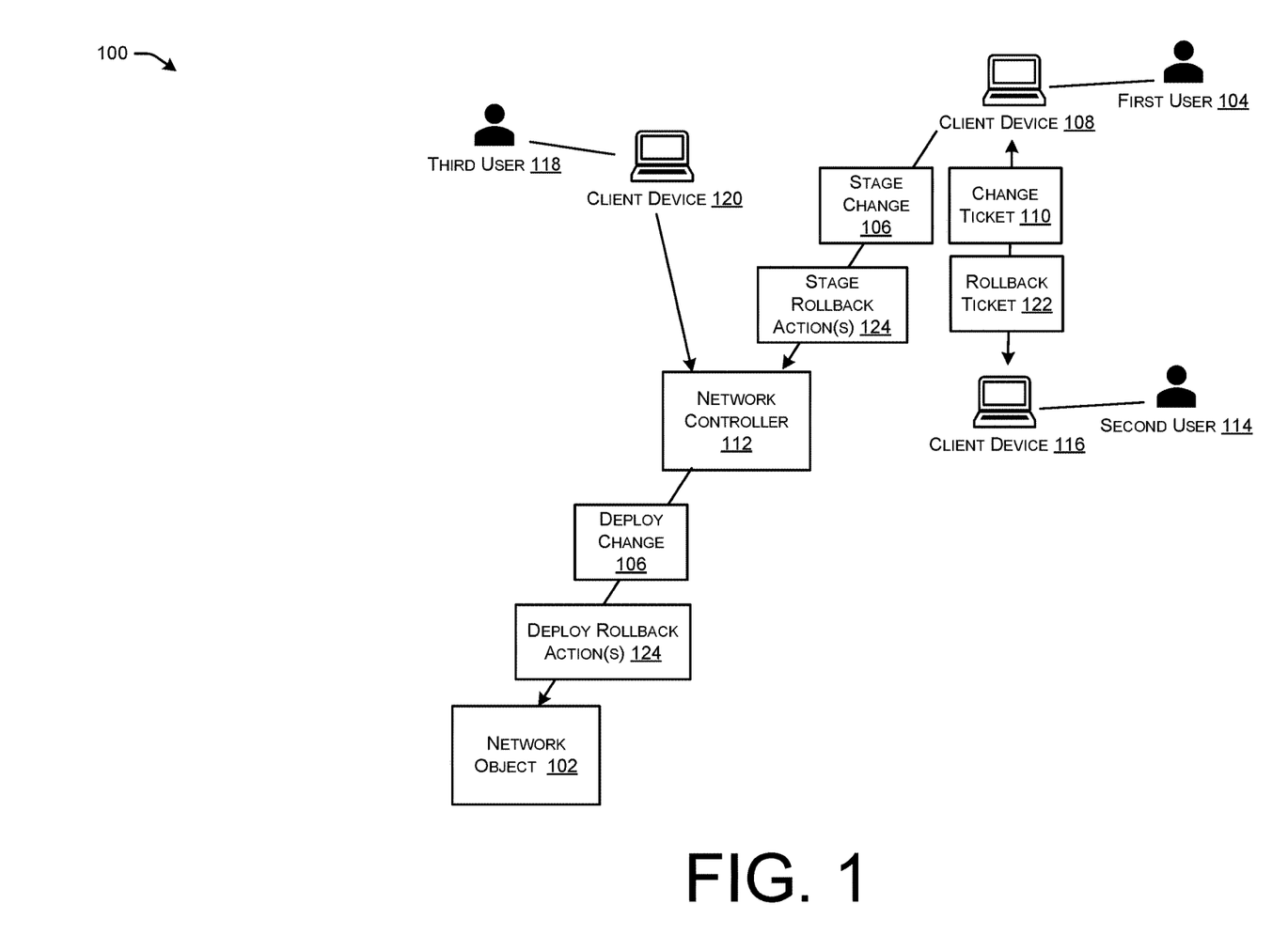
FIG. 1 schematically illustrates an example of a network arrangement that includes a network object, in accordance with techniques and architecture described herein.

FIG. 1 schematically illustrates an example of a network arrangement 100 that includes a network object 102. For example, the network object 102 may be considered a unit of configuration such as, for example, an interface, a link (interfaces connecting two devices), device global, a pair of devices (e.g., virtual private cloud) (VPC)), etc. Configuration changes may be tracked for the network object 102 and may originate from a user interface UI and/or REST APIs. As is known, the network arrangement 100 generally includes many network objects 102. However, for clarity, only a single network object 102 is illustrated.

A first user 104 may wish to deploy a change 106 (action), e.g., a configuration change, with respect to the network object 102. The change 106 may originate from a user interface UI and/or REST APIs via a client device 108. The first user 104, also referred to as a stager, may develop a change ticket 110 that describes the change 106, e.g., the first user 104 associates the change 106 with the change ticket 110. The first user 104 may implement the change 106 at a network controller 112, e.g., the first user 104 may stage the change 106 at the network controller 112. Since each change 106 is associated with a change ticket 110, then only one change may be made at a time at the network object 102. Thus, while a change ticket may include three changes, if the changes are at the same network object, then the changes need to be made serially to avoid collisions. However, if the multiple changes on a change ticket are at multiple network objects and there is no danger of collision when making the changes, then the multiple changes may be made in parallel at the multiple network objects.

In configurations, the first user 104 may provide the change ticket 110 to a second user 114, also referred to as a reviewer/approver, for review and approval. The second user 114 may review and approve the change ticket 110 using a client device 116. A third user 118, also referred to as a deployer, may then deploy the change 106 to the network object 102 via a client device 120 and the network controller 112. In configurations, the first user 104 and the third user 118 may be the same entity. In configurations, the first user 104 and the second user 114 may be the same entity. In some configurations, the first user 104, the second user 114, and the third user 118, may be the same entity, although this is rare as the review/approval process may be better achieved with two separate entities with respect to the first user 104 and the second user 114.

In configurations, the second user 114 may not approve the change ticket 110 and may return it to the first user 104. The reason for non-approval of the change ticket 110 may include a need for more information or additional changes (actions) that should be made in addition to the change 106.

In such a situation, the first user 104 may update the change ticket 110 and return it to the second user 114. Upon approval of the updated change ticket 110, the third user 118 may deploy the change 106 at the network object 102 via the client device 120 and the network controller 112.

In configurations, it may be determined that the change 106 at the network object 102 needs to be rolled back, e.g., undone. This determination may be made by one or more of the first user 104, second user 114, and/or third user 118, or some other entity. Upon determining that the change 106 needs to be rolled back, a user, e.g., the first user 104, may create a rollback ticket 122. The first user 104 may determine which one or more rollback action(s) 124 need to be taken to roll back the change 106. The first user 104 may thus create or describe a plan of rollback action(s) 124 within the rollback ticket 122 for rolling back the change 106. In configurations, the change ticket 110 may be cancelled. The plan of action(s) 124 is based on and associated with the change ticket 110.

In configurations, the first user 104 may implement or stage the plan of action(s) 124 for rolling back the change 106 at the network controller 112 and present the rollback ticket 122 to a user for review/approval, e.g., the second user 114. Upon approval of the rollback ticket, a user, e.g., the third user 118, may deploy the plan of action(s) 124 via the client device 120 and the network controller 112 at the network object 102 to undo the change 106 made by the change ticket 110. If the second user 114 does not approve the rollback ticket 122, the rollback ticket 122 may be presented back to the first user 104 for updating. The reason for non-approval of the rollback ticket 122 may include a need for more information or additional changes (actions) that should be made in addition to the rollback action(s) 124.

Thus, changes made to the network object 102 are always associated with some type of ticket, e.g., a change ticket 110 or a rollback ticket 122. The rollback ticket 122 may be used to specifically undo a particular change at the network object. Changes made subsequent to the changes associated with the original change ticket may, in most cases, be unaffected by the rollback ticket's plan of action(s) to undo the change 106 deployed by the change ticket 110.

Figure 2:
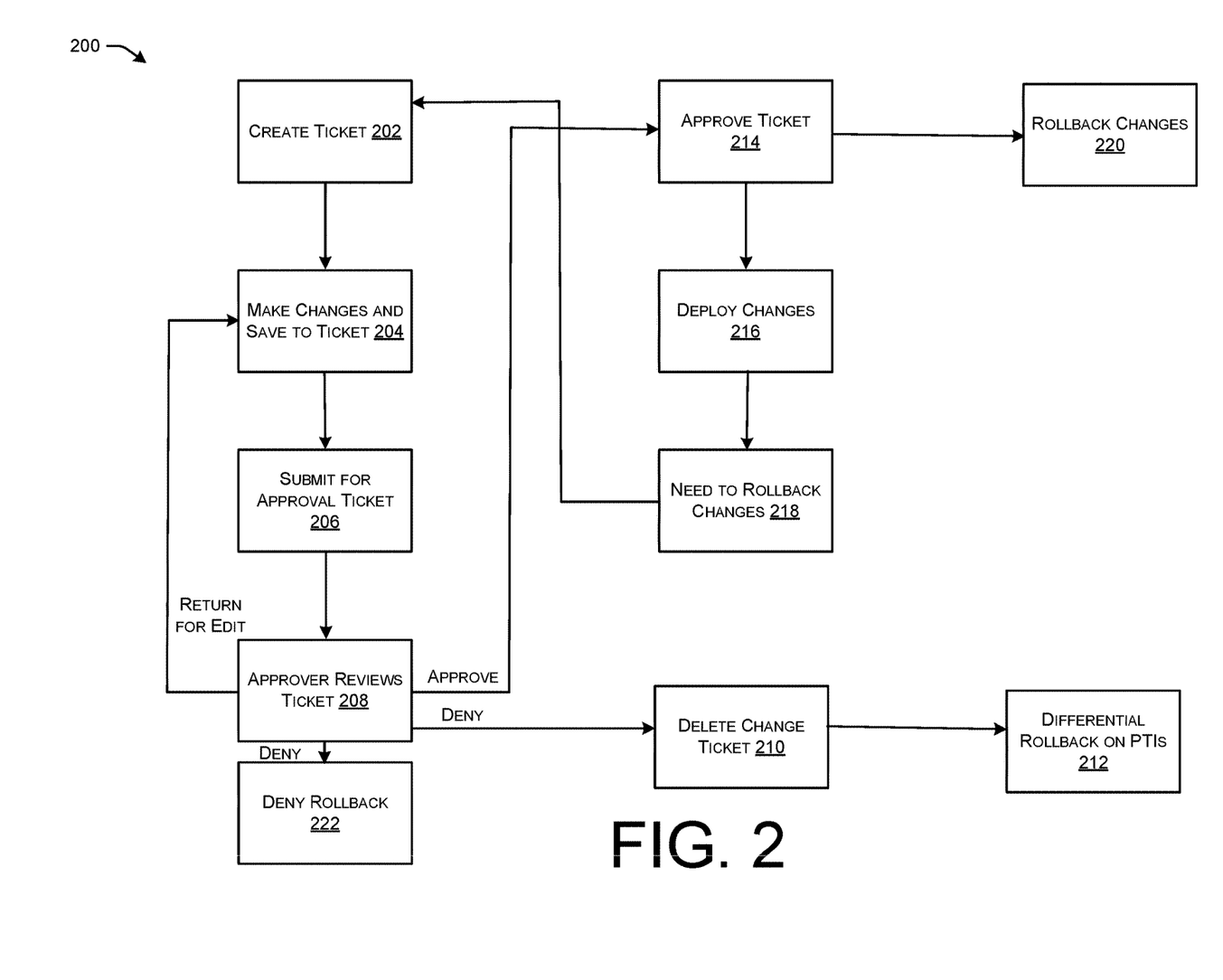
FIG. 2 schematically illustrates a change management flow for changes in network objects in the example of the network arrangement of FIG. 1, in accordance with techniques and architecture described herein.

FIG. 2 schematically illustrates a change management flow 200 in accordance with example configurations described herein. At 202, a change ticket, e.g., change ticket 110, may be created, e.g., by the first user 104. At 204 one or more change(s), e.g., change 106, may be made or staged, e.g., at the network controller 112, and saved to the change ticket. Since each change is associated with a change ticket, then only one change may be made at a time at a network object. Thus, while a change ticket may include three changes, if the changes are at the same network object, then the changes need to be made serially to avoid collisions. However, if the multiple changes on a change ticket are at multiple network objects and there is no danger of collision when making the changes, then the multiple changes may be made in parallel at the multiple network objects.

At 206, the change ticket may be submitted to a reviewer/approver for approval, e.g., submitted by the first user 104 for review and approval by the second user 114. At 208, the change ticket may be reviewed by the reviewer/approver, e.g., the second user 114. In configurations, the reviewer/approver may return the change ticket to 204 for editing or updating. Thus, the stager may update the change ticket and/or make additional changes at the network controller 112 and save these additional changes to the change ticket. The updated change ticket may then be submitted for approval at 206 and the approver/reviewer may then review the updated change ticket at 208.

In configurations, the change ticket may be denied/deleted and/or returned to the stager, who may cancel and/or delete the change ticket at 210. Reasons for cancelling and/or deleting the change ticket may include an error on collision with respect to changes being made at a network object or during deployment. At 212, differential rollback may be executed on packet type identifiers (PTIs).

When the reviewer/approver approves the change ticket at 214, at 216 the approved change ticket may be deployed at one or more network object(s), e.g., via the network controller 112. The change(s) may be deployed by, for example, by the third user 118 using the client device 120 to deploy the change(s) via the network controller 112.

At 218, it may be determined that one or more changes need to be rolled back, e.g., undone. In such a situation, the change management flow 200 returns to 202 where a rollback ticket may be created. The rollback ticket may include one or more actions as a plan for rolling back the change(s) implemented by the change ticket. At 204, the actions for the rollback may be implemented and staged at the network controller and saved to the rollback ticket. At 206, the rollback ticket may be submitted for approval to the reviewer/approver, e.g., the second user 114. At 208, the reviewer/approver may approve the rollback ticket or may submit the rollback ticket for editing and/or updating at 204.

Once the rollback ticket is approved at 208, then at 220 the rollback ticket may be deployed to undo/rollback the changes at the network object. In configurations, at 222 the rollback ticket may be denied and the one or more changes may not be made, e.g., the one or more changes may be left in place. Once the plan of actions has been implemented at the network object, then the flow may end.

Figure 3:
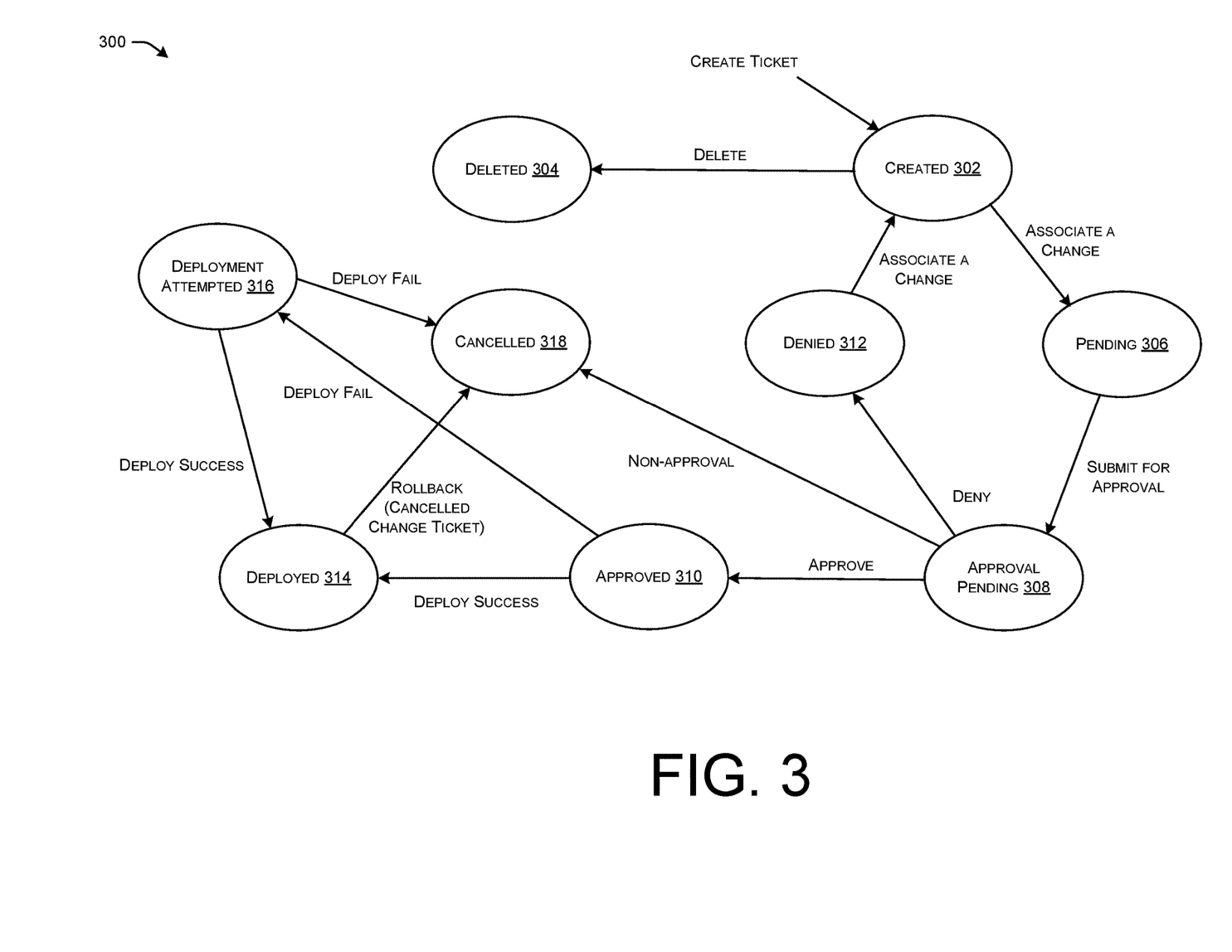
FIG. 3 schematically illustrates an example flow illustrating various states for tickets, e.g., change tickets and rollback tickets, used for changes in the example of the network arrangement of FIG. 1 and the change management flow for changes in network objects in FIG. 2, in accordance with techniques and architecture described herein.

FIG. 3 schematically illustrates a flow 300 illustrating various states for tickets, e.g., change ticket 110, and rollback tickets, e.g., rollback tickets 122. As an example, a change ticket may be created to arrive at the created state 302. The change ticket may be created by, for example, the first user 104. In configurations, the change ticket may be deleted, e.g., purged from the system, to arrive at the deleted state 304. The change ticket may be deleted if the user changes their mind, e.g., determines that the change will not work, determines the change will not be beneficial, etc.

A change may be staged, e.g., at the network controller 112, and associated with the change ticket to arrive at the pending state 306. The change ticket is thus pending and submitted for approval, e.g., to the second user 114 (reviewer/approver) to arrive at the approval pending state 308. The change ticket may be submitted for approval (approval pending state 308) and the change ticket may be approved (approved state 310).

However, the change ticket may be denied placing the change ticket in the denied state 312, e.g., edits and/or changes may be needed to the change ticket in order to implement the desired change. Thus, the changes may be associated with the change ticket and the updated change ticket is now in the pending state 306 and submitted to the reviewer/approver for approval, e.g., the updated change ticket is now in the approval pending state 308.

Once the reviewer/approver approves the change ticket, the change ticket is in the approved state 310. The change may be deployed. If the deployment is successful, then the change ticket has a deployed state 314. However, if the deployment fails, then the state of the change ticket may be deployment attempted state 316. Additional attempts at deploying may be attempted and once deployment is successful, the state of the change ticket is deployed state 314. If deployment continues to fail, then the change ticket may be cancelled, and the state of the change ticket becomes cancelled state 318.

In configurations, the change ticket may not be approved and the reviewer/approver may cancel the change ticket. The state of the change ticket becomes cancelled state 318.

If roll back of the change ticket is needed, a rollback ticket may be created and have created state 302. Once the rollback ticket changes are staged and the changes are associated with the rollback ticket, the rollback ticket has pending state 306. The rollback ticket may be submitted for approval (approval pending state 308) and the rollback ticket may be approved (approved state 310).

However, the rollback ticket may be submitted for approval (approval pending state 308) and the rollback ticket may be denied (denied state 312) and more edits and/or changes may need to be associated with the rollback ticket. The updated rollback ticket may then have pending state 306 and submitted for approval (approval pending state 308). Once the rollback ticket is approved (approved state 310), the changes in the rollback ticket may be deployed to roll back the initial changes (deployed state 314). If the deployment of the rollback changes fails, then the state of the rollback ticket may be deployment attempted state 316 and additional attempts to deploy the rollback changes may be attempted. Once successful, then the rollback changes and the associated ticket are deemed to be deployed state 314. If deployment continues to fail, then the rollback ticket may be cancelled, and the state of the rollback ticket becomes cancelled state 318.

In configurations, the rollback ticket may not be approved and the reviewer/approver may cancel the change ticket. The state of the rollback ticket becomes cancelled state 318.

In configurations, changes, either the initial changes or the rollback changes, may be blocked due to a collision, e.g., other changes already being made at the network object. Since only one change may be made at a time at a network object, then any potential changes, either the initial changes or the rollback changes, are blocked until no other changes are occurring at the network object.

As previously noted, when a change is rolled back, then the original change ticket is cancelled and thus the original ticket has a cancelled state 318. This could be done at the approval pending state 308 where the change ticket and/or the rollback ticket are denied by the reviewer/approver. For example, the reviewer/approver may determine that changes or rollback changes may not be possible or should not occur due to potential harm.

Figure 4:
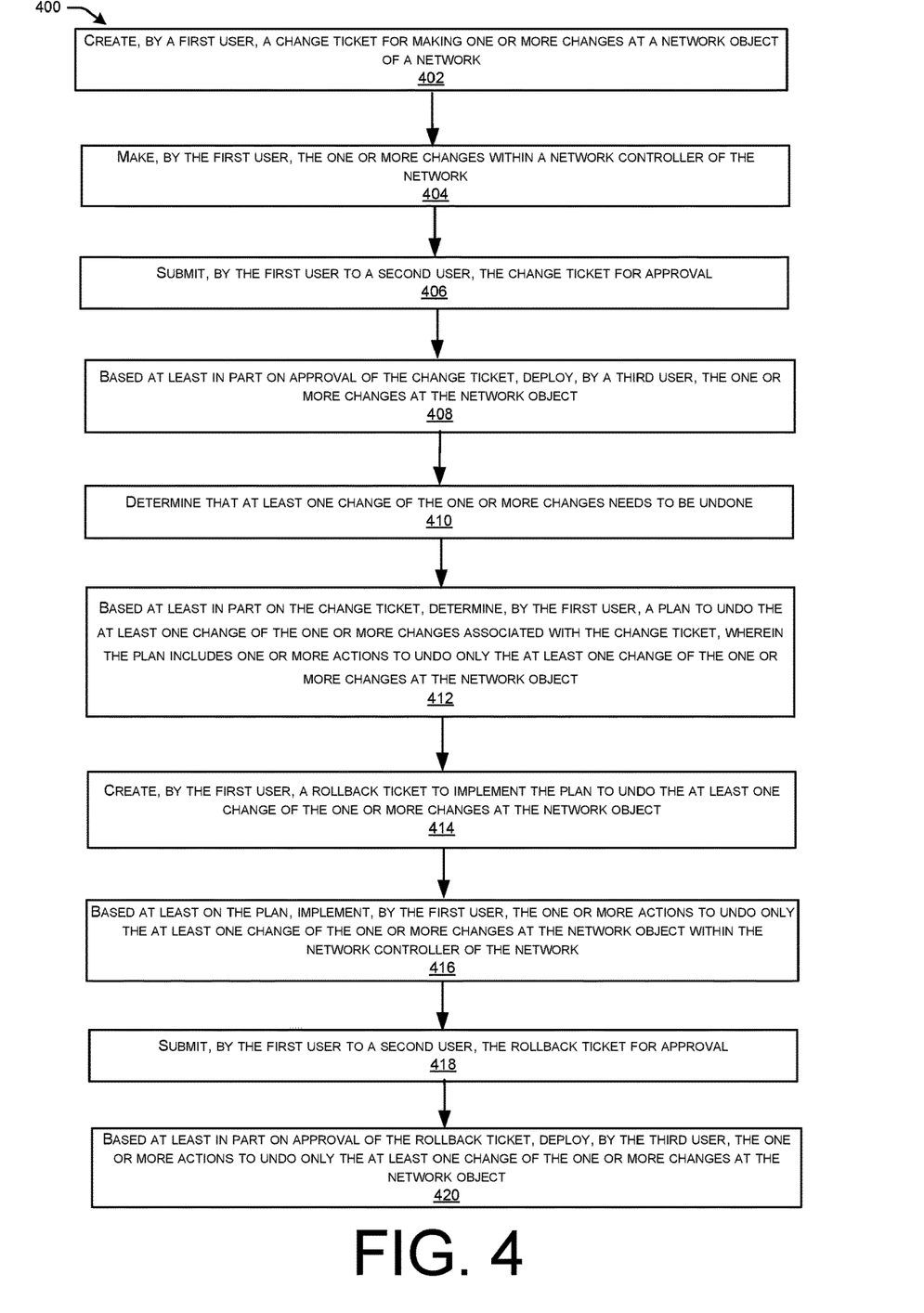
FIG. 4 illustrates a flow diagram of an example method for initializing, reviewing/approving, and deploying changes within a network, e.g., the example network arrangement of FIG. 1, in accordance with the techniques and architecture described herein.

FIG. 4 illustrates a flow diagram of an example method 400 and illustrates aspects of the functions performed at least partly by devices of a network as described with respect to FIGS. 1-3. The logical operations described herein with respect to FIG. 4 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 4 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 4 illustrates a flow diagram of an example method 400 for initializing, reviewing/approving, and deploying changes within a network, e.g., network arrangement 100. In some examples, the method 400 may be performed by a system comprising one or more processors and one or more non-transitory computer-readable media storing computer-executable instructions that, when executed by the one or more processors, cause the one or more processors to perform the method 400.

At 402, a first user creates a change ticket for making one or more changes at a network object of a network. For example, a first user 104 may wish to deploy a change 106, e.g., a configuration change, with respect to the network object 102. The change 106 may originate from a user interface UI and/or REST APIs via a client device 108. The first user 104, also referred to as a stager, may develop a change ticket 110 that describes the change 106, e.g., the first user 104 associates the change 106 with the change ticket 110.

At 404, the first user makes the one or more changes within a network controller of the network. For example, the first user 104 may implement the change 106 at a network controller 112, e.g., the first user 104 may stage the change 106 at the network controller 112. Since each change 106 is associated with a change ticket 110, then only one change may be made at a time at the network object 102. Thus, while a change ticket may include three changes, if the changes are at the same network object, then the changes need to be made serially to avoid collisions. However, if the multiple changes on a change ticket are at multiple network objects and there is no danger of collision when making the changes, then the multiple changes may be made in parallel at the multiple network objects.

At 406, the first user submits the change ticket to a second user for approval. For example, in configurations, the first user 104 may provide the change ticket 110 to a second user 114, also referred to as a reviewer/approver, for review and approval. The second user 114 may review and approve the change ticket 110 using a client device 116.

At 408, based at least in part on approval of the change ticket, a third user deploys the one or more changes at the network object. For example, a third user 118, also referred to as a deployer, may deploy the change 106 to the network object 102 via a client device 120 and the network controller 112. In configurations, the first user 104 and the third user 118 may be the same entity. In configurations, the first user 104 and the second user 114 may be the same entity. In some configurations, the first user 104, the second user 114, and the third user 118, may be the same entity, although this is rare as the review/approval process may be better achieved with two separate entities with respect to the first user 104 and the second user 114.

However, in configurations, the second user 114 may not approve the change ticket 110 and may return it to the first user 104. The reason for non-approval of the change ticket 110 may include a need for more information or additional changes (actions) that should be made in addition to the change 106. In such a situation, the first user 104 may update the change ticket 110 and return it to the second user 114. Upon approval of the updated change ticket 110, the third user 118 may deploy the change 106 at the network object 102 via the client device 120 and the network controller 112.

At 410, it is determined that at least one change of the one or more changes needs to be undone. For example, in configurations, it may be determined that the change 106 at the network object 102 needs to be rolled back, e.g., undone. This determination may be made by one or more of the first user 104, second user 114, and/or third user 118, or some other entity.

At 412, based at least in part on the change ticket, the first user determines a plan to undo the at least one change of the one or more changes associated with the change ticket, wherein the plan includes one or more actions to undo only the at least one change of the one or more changes at the network object. At 414, the first user creates a rollback ticket to implement the plan to undo the at least one change of the one or more changes at the network object. For example, upon determining that the change 106 needs to be rolled back, a user, e.g., the first user 104, may create a rollback ticket 122. The first user 104 may determine which one or more rollback action(s) 124 need to be taken to roll back the change 106. The first user 104 may thus create or describe a plan of rollback action(s) 124 within the rollback ticket 122 for rolling back the change 106. In configurations, the change ticket 110 may be cancelled. The plan of action(s) 124 is based on and associated with the change ticket 110.

At 416, based at least on the plan, the first user implements the one or more actions to undo only the at least one change of the one or more changes at the network object within the network controller of the network. In configurations, the first user 104 may implement or stage the plan of action(s) 124 for rolling back the change 106 at the network controller 112.

At 418, the first user submits the rollback ticket to the second user for approval. For example, the first user 104 may present the rollback ticket 122 to a user for review/approval, e.g., the second user 114.

At 420, based at least in part on approval of the rollback ticket, the third user deploys the one or more actions to undo only the at least one change of the one or more changes at the network object. For example, upon approval of the rollback ticket, a user, e.g., the third user 118, may deploy the plan of action(s) 124 via the client device 120 and the network controller 112 at the network object 102 to undo the change 106 made by the change ticket 110. If the second user 114 does not approve the rollback ticket 122, the rollback ticket 122 may be presented back to the first user 104 for updating. The reason for non-approval of the rollback ticket 122 may include a need for more information or additional changes (actions) that should be made in addition to the rollback action(s) 124.

Thus, in accordance with configurations described herein, techniques and architecture provide for initializing, reviewing/approving, and deploying changes within a network. Each change is associated with a particular change ticket. When a change needs to be rolled back, e.g., the change needs to be undone, the original change ticket may be analyzed to determine what actions need to be performed to roll back the change. A plan of the needed actions may then be presented to a reviewer in a rollback ticket. The original change ticket may be cancelled and a new ticket, e.g., the rollback ticket, may be prepared that includes the plan for the rollback, e.g., the one or more actions needed to roll back the initial change. In configurations, a change ticket may include multiple changes and thus, for rollback, either all the changes associated with the change ticket may be rolled back or only the last change or action that was initially made may be rolled back. More particularly, changes made to the network object are always associated with some type of ticket, e.g., a change ticket or a rollback ticket. The rollback ticket may be used to specifically undo a particular change at the network object. Changes made subsequent to the changes associated with the original change ticket may, in most cases, be unaffected by the rollback ticket's plan of action(s) to undo the change deployed by the change ticket.

Figure 5:
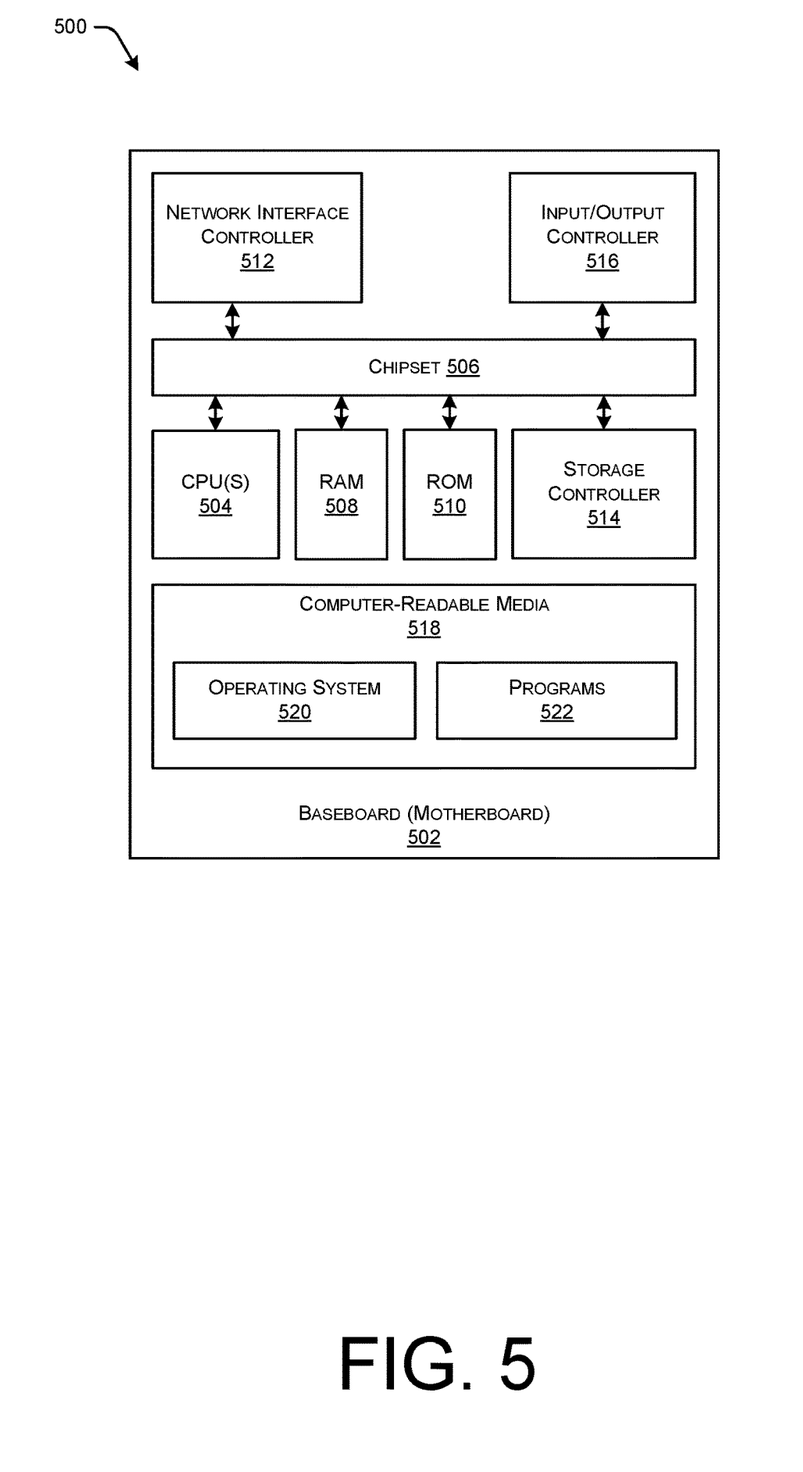
FIG. 5 is a computer architecture diagram showing an example computer hardware architecture for implementing a device that can be utilized to implement aspects of the various technologies presented herein.

FIG. 5 shows an example computer architecture for a computing device 500 capable of executing program components for implementing the functionality described above. In configurations, one or more of the computing devices 500 may be used to implement one or more of the components of FIGS. 1-4. The computer architecture shown in FIG. 5 illustrates a conventional server computer, router, switch, workstation, desktop computer, laptop, tablet, network appliance, e-reader, smartphone, or other computing device, and can be utilized to execute any of the software components presented herein. The computing device 500 may, in some examples, correspond to a physical device or resources described herein.

The computing device 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computing device 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computing device 500. The chipset 506 can further provide an interface to a computer-readable storage medium such as a read-only memory ("ROM") 510 or non-volatile RAM ("NVRAM") for storing basic routines that help to startup the computing device 500 and to transfer information between the various components and devices. The ROM 510 or NVRAM can also store other software components necessary for the operation of the computing device 500 in accordance with the configurations described herein.

The computing device 500 can operate in a networked environment using logical connections to remote computing devices and computer systems through a network. The chipset 506 can include functionality for providing network connectivity through a NIC 512, such as a gigabit Ethernet adapter. In configurations, the NIC 512 can be a smart NIC (based on data processing units (DPUs)) that can be plugged into data center servers to provide networking capability. The NIC 512 is capable of connecting the computing device 500 to other computing devices over networks. It should be appreciated that multiple NICs 512 can be present in the computing device 500, connecting the computer to other types of networks and remote computer systems.

The computing device 500 can include a storage device 518 that provides non-volatile storage for the computer. The storage device 518 can store an operating system 520, programs 522, and data, which have been described in greater detail herein. The storage device 518 can be connected to the computing device 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computing device 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 500 can further read information from the storage device 518 by detecting the physical states or characteristics of one or more particular locations within the physical storage units.

In addition to the mass storage device 518 described above, the computing device 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 500. In some examples, the operations performed by the cloud network, and or any components included therein, may be supported by one or more devices similar to computing device 500. Stated otherwise, some or all of the operations described herein may be performed by one or more computing devices 500 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computing device 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computing device 500.

In one embodiment, the storage device 518 or other computer-readable storage media is encoded with computer-executable instructions which, when loaded into the computing device 500, transform the computer from a general-purpose computing system into a special-purpose computer capable of implementing the embodiments described herein. These computer-executable instructions transform the computing device 500 by specifying how the CPUs 504 transition between states, as described above. According to one embodiment, the computing device 500 has access to computer-readable storage media storing computer-executable instructions which, when executed by the computing device 500, perform the various processes described above with regard to FIGS. 1-4. The computing device 500 can also include computer-readable storage media having instructions stored thereupon for performing any of the other computer-implemented operations described herein.

The computing device 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computing device 500 might not include all of the components shown in FIG. 5, can include other components that are not explicitly shown in FIG. 5, or might utilize an architecture completely different than that shown in FIG. 5.

The computing device 500 may support a virtualization layer, such as one or more virtual resources executing on the computing device 500. In some examples, the virtualization layer may be supported by a hypervisor that provides one or more virtual machines running on the computing device 500 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    creating, by a first user, a change ticket for making one or more changes at a network object of a network;
    making, by the first user, the one or more changes within a network controller of the network;
    submitting, by the first user to a second user, the change ticket for approval;
    based at least in part on approval of the change ticket, deploying, by a third user, the one or more changes at the network object;
    determining that at least one change of the one or more changes needs to be undone;
    based at least in part on the change ticket, determining, by the first user, a plan to undo the at least one change of the one or more changes associated with the change ticket, wherein the plan includes one or more actions to undo only the at least one change of the one or more changes at the network object;
    creating, by the first user, a rollback ticket to implement the plan to undo the at least one change of the one or more changes at the network object;
    based at least on the plan, implementing, by the first user, the one or more actions to undo only the at least one change of the one or more changes at the network object within the network controller of the network;
    submitting, by the first user to the second user, the rollback ticket for approval; and
    based at least in part on approval of the rollback ticket, deploying, by the third user, the one or more actions to undo only the at least one change of the one or more changes at the network object.

2. The method of claim 1, further comprising:
    based at least in part on non-approval of the change ticket, sending, by the second user to the first user, the change ticket;
    editing, by the first user, the change ticket; and
    re-submitting, by the first user to a second user, the change ticket for approval.

3. The method of claim 1, further comprising:
    based at least in part on non-approval of the change ticket, sending, by the second user to the first user, the change ticket; and
    deleting, by the first user, the change ticket.

4. The method of claim 1, wherein at least the first user is also the third user.

5. The method of claim 1, wherein:
    the change ticket comprises multiple changes for the network object; and
    deploying the multiple changes at the network object comprises serially deploying the multiple changes at the network object.

6. The method of claim 5, wherein determining that at least one change of the one or more changes needs to be undone comprises determining that only a last change of the one or more changes needs to be undone.

7. The method of claim 5, wherein determining that at least one change of the one or more changes needs to be undone comprises determining that all of the one or more changes need to be undone.

8. The method of claim 1, wherein:
    the change ticket comprises multiple changes for multiple network objects; and
    deploying the multiple changes at the multiple network objects comprises deploying the multiple changes at the multiple network objects in parallel.

9. A system comprising:
    one or more processors; and
    one or more non-transitory computer-readable media storing computer-executable instructions that, when executed by the one or more processors, cause the one or more processors to perform actions comprising:
        creating, by a first user, a change ticket for making one or more changes at a network object of a network;
        making, by the first user, the one or more changes within a network controller of the network;
        submitting, by the first user to a second user, the change ticket for approval;
        based at least in part on approval of the change ticket, deploying, by a third user, the one or more changes at the network object;
        determining that at least one change of the one or more changes needs to be undone;
        based at least in part on the change ticket, determining, by the first user, a plan to undo the at least one change of the one or more changes associated with the change ticket, wherein the plan includes one or more actions to undo only the at least one change of the one or more changes at the network object;
        creating, by the first user, a rollback ticket to implement the plan to undo the at least one change of the one or more changes at the network object;
        based at least on the plan, implementing, by the first user, the one or more actions to undo only the at least one change of the one or more changes at the network object within the network controller of the network;
        submitting, by the first user to the second user, the rollback ticket for approval; and
        based at least in part on approval of the rollback ticket, deploying, by the third user, the one or more actions to undo only the at least one change of the one or more changes at the network object.

10. The system of claim 9, wherein the actions further comprise:
    based at least in part on non-approval of the change ticket, sending, by the second user to the first user, the change ticket;
    editing, by the first user, the change ticket; and
    re-submitting, by the first user to a second user, the change ticket for approval.

11. The system of claim 9, wherein the actions further comprise:
    based at least in part on non-approval of the change ticket, sending, by the second user to the first user, the change ticket; and
    deleting, by the first user, the change ticket.

12. The system of claim 9, wherein at least the first user is also the third user.

13. The system of claim 9, wherein:
    the change ticket comprises multiple changes for the network object; and
    deploying the multiple changes at the network object comprises serially deploying the multiple changes at the network object.

14. The system of claim 13, wherein determining that at least one change of the one or more changes needs to be undone comprises determining that only a last change of the one or more changes needs to be undone.

15. The system of claim 13, wherein determining that at least one change of the one or more changes needs to be undone comprises determining that all of the one or more changes need to be undone.

16. The system of claim 9, wherein:
the change ticket comprises multiple changes for multiple network objects; and
deploying the multiple changes at the multiple network objects comprises deploying the multiple changes at the multiple network objects in parallel.

17. One or more non-transitory computer-readable media storing computer-executable instructions that, when executed by one or more processors, cause the one or more processors to perform actions comprising:
creating, by a first user, a change ticket for making one or more changes at a network object of a network;
making, by the first user, the one or more changes within a network controller of the network;
submitting, by the first user to a second user, the change ticket for approval;
based at least in part on approval of the change ticket, deploying, by a third user, the one or more changes at the network object;
determining that at least one change of the one or more changes needs to be undone;
based at least in part on the change ticket, determining, by the first user, a plan to undo the at least one change of the one or more changes associated with the change ticket, wherein the plan includes one or more actions to undo only the at least one change of the one or more changes at the network object;
creating, by the first user, a rollback ticket to implement the plan to undo the at least one change of the one or more changes at the network object;
based at least on the plan, implementing, by the first user, the one or more actions to undo only the at least one change of the one or more changes at the network object within the network controller of the network;
submitting, by the first user to the second user, the rollback ticket for approval; and
based at least in part on approval of the rollback ticket, deploying, by the third user, the one or more actions to undo only the at least one change of the one or more changes at the network object.

18. The one or more non-transitory computer-readable media of claim 17, wherein the actions further comprise:
based at least in part on non-approval of the change ticket, sending, by the second user to the first user, the change ticket;
editing, by the first user, the change ticket; and
re-submitting, by the first user to a second user, the change ticket for approval.

19. The one or more non-transitory computer-readable media of claim 17, wherein the actions further comprise:
based at least in part on non-approval of the change ticket, sending, by the second user to the first user, the change ticket; and
deleting, by the first user, the change ticket.

20. The one or more non-transitory computer-readable media of claim 17, wherein:
the change ticket comprises multiple changes for the network object; and
deploying the multiple changes at the network object comprises serially deploying the multiple changes at the network object.

* * * * *